United States Patent Office 3,130,013
Patented Apr. 21, 1964

3,130,013
METHODS OF PRODUCING SILICON OF
HIGH PURITY
Jack McCreath Wilson, London, and Jack Augustus Radley and Eileen Dulcie Kahn, Reading, England, assignors to International Standard Electric Corporation, New York, N.Y.
Filed May 28, 1957, Ser. No. 662,298
Claims priority, application Great Britain Sept. 25, 1953
4 Claims. (Cl. 23—223.5)

This application is a continuation-in-part of application Serial No. 457,408, filed September 21, 1954, now abandoned.

This invention relates to a process for the manufacture of a body of silicon.

It is well known to make rectifier devices using a body of silicon, but such devices have not proved entirely satisfactory and have been superseded to a very large extent by similar devices using germanium as the semi-conductor material, even though silicon is abundantly present in nature and germanium is a rare element.

It is also well known that the characteristics of rectifiers are affected to a very great extent by relatively small amounts of impurities present in the semi-conductor material. The difficulties experienced with silicon rectifiers are in large degree due to the difficulty of obtaining silicon with a controlled amount and kind of impurity. In order that silicon of this kind may be obtained, it is necessary first to obtain silicon of a high degree of purity.

Attempts have been made by various different processes to produce high purity silicon. Thus silicon stated to be hyper-pure has been prepared by the vapour phase reduction of silicon tetrachloride by means of zinc and later digesting the product with acids to purify the resultant silicon. Even this process when carried out with the greatest degree of care to avoid contamination of the product has been found by us not to produce silicon of sufficiently high purity to guarantee that the impurities were present to such a small extent as not to affect the electrical resistivity of the product.

It is accordingly an object of the present invention to provide a process of producing silicon which is capable of yielding silicon so pure that there is less than a spectrographic trace of any significant impurity.

In order to obtain pure silicon it is necessary to start with a silicon compound that can be obtained in a high degree of purity. Silane ($SiH_4$) is such a compound.

The thermal decomposition of silane is known theoretically (see J.A.C.S. 1936, vol. 58, p. 109) but the method has never been used commercially for the production of silicon. This is probably due to the fact that no practicable method was known for producing reasonably pure silicon in large quantities. Another reason is that it was not known how to produce the silicon directly in monocrystalline form. The thermal decomposition of silane normally produces the silicon in the form of a conglomeration of small crystals which is unsuitable for use as a semiconductor, and the re-melting necessary to convert the silicon to monocrystalline form presents serious difficulties in the avoidance of contamination.

It is an object of the invention to produce substantially pure silicon on a commercial scale.

Another object is to provide a convenient method of producing extremely pure silane in large quantities for producing silicon by thermal decomposition of the silane.

According to the present invention a process of manufacture of substantially pure silicon comprises the step of passing substantially pure silane in a molecular concentration substantially less than normal into a zone heated to the decomposition temperature of silane.

In this statement, "silane" means the compound $SiH_4$ only and does not include any other hydride of silicon. By "molecular concentration" is meant the percentage ratio of the number of silane molecules actually present in one cubic centimetre of the gas to the number which would be present in one cubic centimetre of pure silane gas at atmospheric pressure and at the decomposition temperature. The statement that the "molecular concentration is substantially less than normal" means that the above defined ratio is substantially less than 100 percent. The reduced molecular concentration may be obtained by storing the pure silane after generation, and then drawing it off under reduced pressure into the decomposition zone. Alternatively, the silane may be diluted with an inert gas such as argon, by which, for example, it may be swept into the decomposition zone from the vessel in which it is generated.

This reduced molecular concentration may be called a partial pressure. Where the term "partial pressure" is used it applies to a reduced actual pressure of pure silane as well as to a small concentration of the silane in a mixture with other gas at or near normal atmospheric pressures.

Since the decomposition is carried out by heat alone, there is no risk of contamination by a chemical reagent.

By means of this process we have been able to obtain silicon of a higher degree of purity than any previously obtainable.

The silicon is generally deposited in the form of dust, and for use in rectifiers or other purposes the silicon dust thus produced must be converted into a solid body and obviously great precautions must be taken to avoid contamination of silicon during any processes used for such conversion.

The process of manufacture of silicon according to the present invention readily lends itself to the direct production of a coherent body of silicon by locating a seed of silicon in the decomposition zone. By reducing the molecular concentration of silane, the number of molecules of silicon formed can be limited to the number that can fit into the growth of a coherent body at the temperature concerned. The seed of silicon is, in this method, moved away from the decomposition zone at a rate which keeps the growing surface at substantially the same place.

It should be noted that silane may be decomposed by heat either by a heterogeneous (surface) reaction or by a homogeneous (gas phase) reaction. In depositing silicon by the decomposition of silane upon a silicon surface, conditions must be such that only the surface reaction occurs. The streaming velocity of the gas at the growing surface and the pressure of the gas and the temperature of the surface are interdependent factors. Using argon, or one of the other chemically inert gases, to sweep the silane to the growing surface, it is found that even at the comparatively low decomposition temperature of 800° C. for the growing surface, which is below the melting point of silicon, the streaming velocity of the gas was required to be about 200 litres per hour to prevent the gas phase decomposition. The molecular concentration of the silane was about 0.25 percent.

For higher decomposition temperatures, it is in general necessary to decrease the flow rate of the silane and to increase the flow rate of the inert gas. This will however reduce the growth rate of the silicon.

Instead, however, of sweeping the silane from the vessel in which it is generated by means of an inert gas, it is preferable to store the silane in conventional types of gas storage cylinders and afterwards to draw off the silane from such a cylinder into the decomposition zone. The considerations set out above as to ensuring decomposition only by a surface reaction also apply to this process, and in order to reduce the molecular concentration of the silane and to ensure the requisite flow at the growing surface for this purpose, the silane is drawn into the decomposition zone under reduced pressure.

The invention will be better understood from the following description of two different embodiments thereof taken in conjunction with the accompanying drawings in which.

Figure 1:
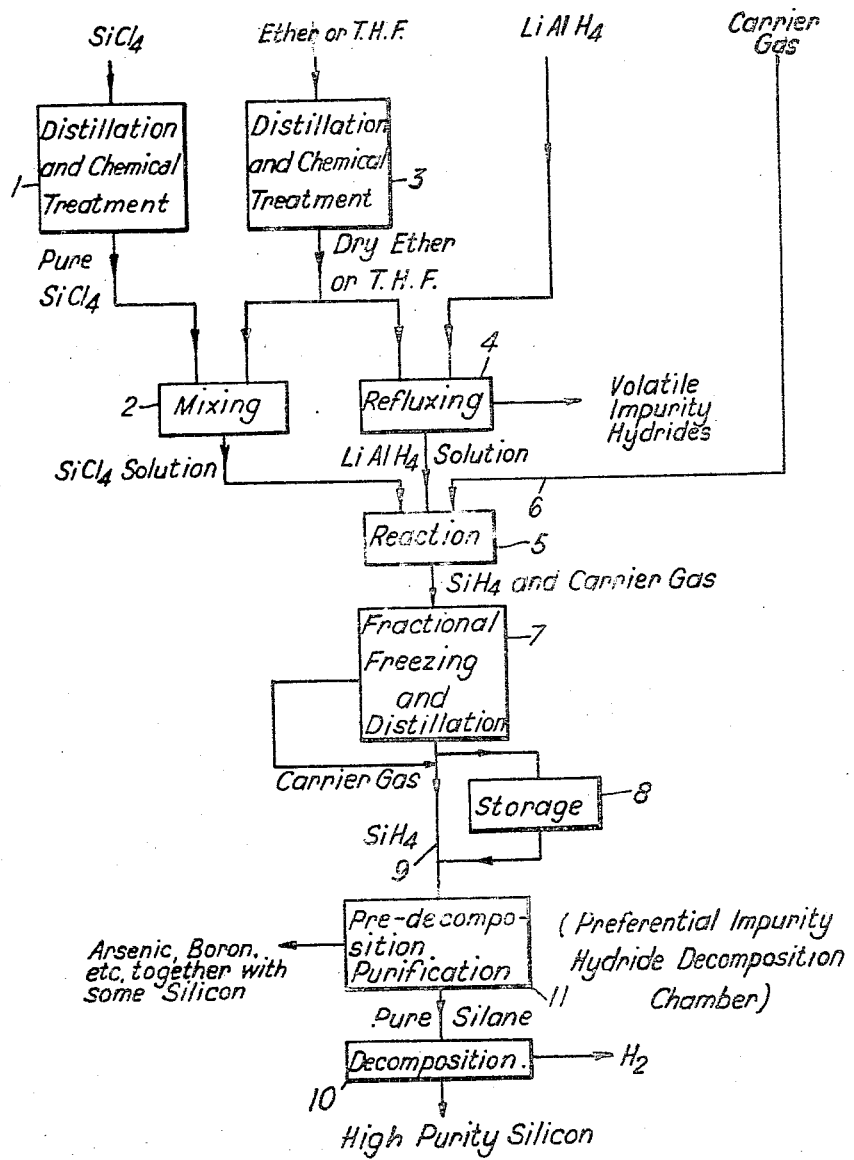
FIG. 1 is a flow sheet of a method of an embodiment of the invention.

Referring to the drawing, and first to FIG. 1, the reactants for producing silane are preferably silicon tetrachloride and lithium aluminium hydride. Silicon tetrachloride is purified, as indicated by step 1. Refluxing with copper turnings reduces the arsenic content from 1 microgram per millilitre to less than 0.01 microgram per millilitre. All but very minute quantities of arsenic and other elements present in the form of chlorides are then removed by fractional distillation, the boiling points of the chlorides being fairly widely separated.

The silicon tetrachloride is mixed with ether or tetrahydrofuran from 3 as indicated at 2, after it has been purified by known methods of distillation and chemical treatment at 1.

Lithium aluminium hydride is refluxed, as indicated at 4, with dry ether or tetrahydrofuran, thus eliminating volatile hydrides. The purified resulting solution or suspension of lithium aluminium hydride is reacted with the solution of silicon tetrachloride, as indicated at 5, a stream of inert gas such as argon, previously purified, being first introduced as indicated at 6 to sweep out any air present in the reaction vessel.

It should here be noted that it is advisable that the whole of the apparatus used for the steps of the process hitherto specified should be made of quartz rather than glass, since the materials used may pick up small amounts of undesirable impurities from glass.

The stream of carrier gas fed in as shown at 6 is continued in order to sweep the silane generated from the reaction vessel and the mixture of carrier gas and silane subjected as indicated at 7 to fractional freezing and fractional distillation in order still further to ensure purity of the silane.

The silane may then be passed into storage cylinders as indicated at 8, or may be passed without storage as indicated at 9, to the decomposition stage. The thermal decomposition stage 10 is always performed with less than normal molecular concentration of the silane, and this may be accomplished either by drawing the silane from the storage stage 8 by reduced pressure as explained hereinafter, or by re-introducing the purified carrier gas eliminated at stage 7 to sweep the silane into the decomposition zone.

The purified silane from stage 7 may still contain minute traces of other volatile hydrides. Silane is a very stable hydride as regards thermal decomposition and its decomposition temperature is higher than those of any hydrides of other elements that may still be present. In order to remove these traces of other hydrides the silane may be passed through a decomposition purification stage 11 in which hydrides of arsenic, boron, and other possible significant impurities are decomposed. A small amount of silane may also be decomposed, the resulting silicon, arsenic, boron, etc. being thus removed.

The silane is decomposed at stage 10, preferably to deposit silicon on to a seed of silicon, hydrogen being produced and led off.

It should be noted that there are no corrosive resultants of the decomposition, and thus the silicon produced is in a substantially pure state, indeed so pure that spectrographic analysis shows no measurable amount of impurities.

As stated above, the conditions of molecular concentration and gas velocity immediately above the surface of the seed in stage 10 are adjusted to secure decomposition of the silane only by a surface reaction.

Figure 2:
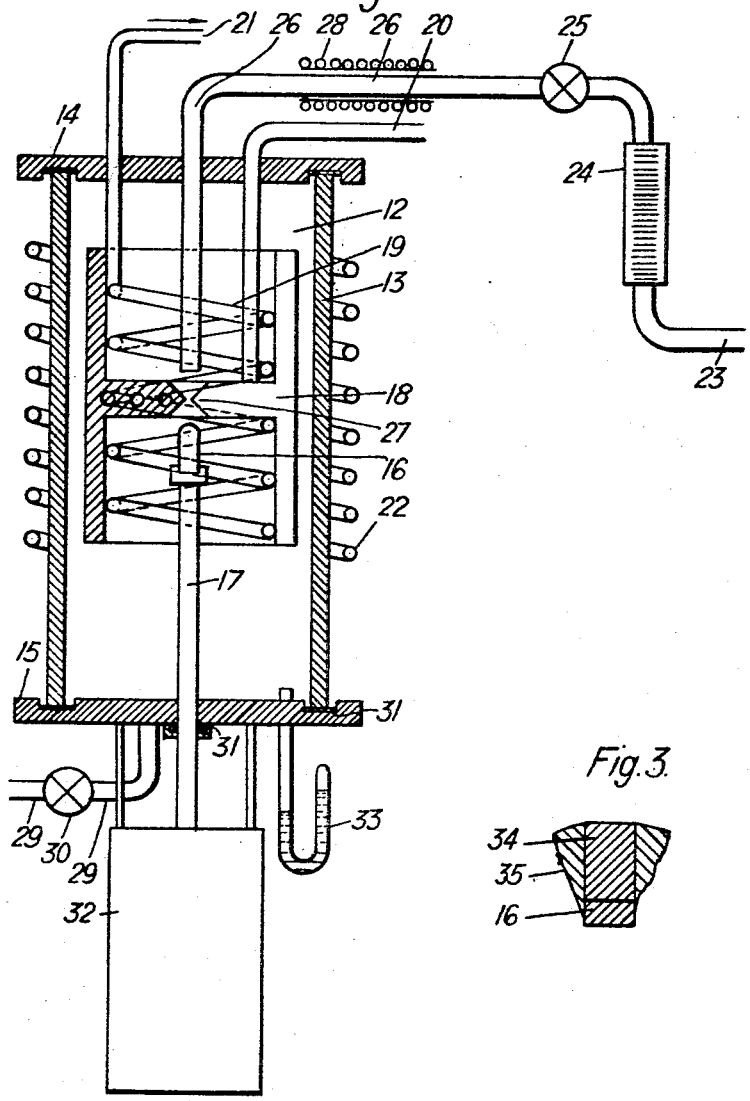
FIG. 2 shows apparatus for drawing silane under reduced pressure into a decomposition zone in which it is deposited on the surface of a seed of silicon.

FIG. 2 shows an example of apparatus used in a method of growing pure crystalline silicon from gaseous silane. The decomposition chamber 12 is constituted by a cylinder 13 with end plates 14 and 15 sealed to the cylinder 13 in vacuum tight manner. A crystalline silicon seed 16 is fixed in a holder supported on a rod 17 and its upper surface heated by direct coupling to a copper current concentrator 18 which is water cooled by circulating water through a coiled tube 19, water entering at 20 and leaving at 21. The concentrator 18 forms the secondary winding of a radio frequency transformer the primary coil 22 of which forms a tuned circuit of an induction heater oscillating at a frequency of approximately 1 mc./s.

Silane is admitted to the chamber 12 from a storage cylinder or from the fractional freezing and distillation stage 7, FIG. 1, through an inlet 23 and passes through a flow meter 24 and a valve 25 to an inlet pipe 26 which terminates just above an aperture 27 in the concentrator 18. The contour of the aperture 27 in proximity to the face of the silicon seed 16 is arranged to have a shape which will melt the upper surface of the seed 16 and give a solid-liquid interface of the required form.

The horizontal portion of the inlet pipe 26 passes through an induction heating coil 28 with a metallic core whereby the temperature within the core is raised to between 300° and 500° C. Any decomposition products form an adherent deposit on the walls of the tube 26.

The silane is drawn through the aperture 27 in the concentrator 18 by means of a vacuum pump connected to an outlet pipe 29, with the interposition of a pressure regulating tap 30.

The silane is decomposed in a zone just above the upper face 9 of the seed 16 and according to one example of the process, the temperature and pressure in the decomposition zone may be 1100° C. and 10 mm. Hg, respectively, while the rate of flow of the silane into the zone may be 20 litres per hour. Under these conditions, the molecular concentration in the zone is $$(10/760) \times 100 = 1.3$$

percent, and the growth rate of the silicon seed 16 is about 14 grams per hour.

The rod 17 passes through a vacuum seal 31 in the lower plate 15 and is connected to a mechanism 32 which rotates and lowers it at a predetermined rate.

The flow rate as read on the meter 24 and the pressure as read on a manometer 33 are adjusted by the valves 25 and 30 to give optimum crystal growth.

The rate at which the rod 17 is lowered is adjusted to be sufficient to keep the surface of the seed or body 16, growing as it does with the addition of silicon, at the same level. The silicon in the growing body as it is lowered from this level gradually cools and crystallises.

If the seed 16 originally present is a monocrystal, the growth takes place in monocrystalline form at the upper surface if the molecular concentration of the silane adjacent to the growing face be such as to ensure decomposition substantially wholly on the surface of the seed and substantially avoid a gaseous phase reaction. This can be secured by proper adjustment of the pressure in the chamber and the rate of flow in accordance with the temperature of the upper growing surface.

Figure 3:
FIG. 3 shows the shape of a body of silicon produced by thermal decomposition of silane on a seed of silicon.

A certain amount of polycrystalline material is also formed on the outside of the monocrystal, the appearance of the grown body being as shown in cross section in FIG. 3. The original monocrystal is shown at 16. Monocrystalline growth builds up the extension 34 of the original monocrystal 16 whilst extraneous polycrystalline growth occurs as shown at 35. The portion 35 may be ground away if it is desired to use only the monocrystal.

On the other hand if a faster rate of growth is desired the original seed 16 may be polycrystalline and the conditions adjusted for such faster rate of growth, for which however it is still advisable to secure only a surface decomposition. The polycrystalline body of silicon may then be converted into a monocrystal by the known method of melting and pulling a crystal from the melt.

Having described the process of thermally decomposing pure silane according to the invention for producing silicon, with one specific example of the choice of the relevant parameters, some further numerical examples will now be given.

According to the preferred process, the silane is drawn into the decomposition zone under reduced pressure without the use of an inert gas for sweeping it into the zone. In this case values within the following ranges have been used:

| | |
|---|---|
| Pressure in decomposition chamber (mm. Hg) | 10 to 15 |
| Flow rate of silane (litres per hour at S.T.P.) | 15 to 30 |
| Decomposition temperature (° C.) | 900 to 1200 |
| Growth rate (grams of silicon per hour) | 10.5 to 18 |
| Molecular concentration, percent | 1.3 to 2.0 |

It should, however, be understood that the ranges given above do not represent the extreme limits of possible values which could be used. For example, a wider range of molecular concentration would certainly be possible.

The following table gives specific values of the parameters used in four particular examples of the process selected from the above ranges. Example 3 is the same as the one already quoted above:

| | Example | | | |
|---|---|---|---|---|
| | 1 | 2 | 3 | 4 |
| Pressure (mm. Hg) | 10 | 10 | 10 | 15 |
| Flow rate (litres per hour) | 26 | 26 | 20 | 15 |
| Temperature (° C.) | 1,000 | 1,100 | 1,100 | 1,200 |
| Growth rate (gm. per hour) | 16 | 18 | 14 | 10.5 |
| Molecular concentration, percent | 1.3 | 1.3 | 1.3 | 2.0 |

In all these cases the yield, that is, the percentage of silane actually decomposed, was about 50%.

A further example will be given of the process when argon was used to sweep the silane into the decomposition zone:

| | |
|---|---|
| Pressure (mm. Hg) | 760 |
| Flow rate of silane (litres per hour at S.T.P.) | 0.5 |
| Flow rate of argon (litres per hour at S.T.P.) | 200 |
| Decomposition temperature (° C.) | 800 |
| Growth rate of silicon (gm. per hour) | 0.5 |
| Molecular concentration, percent | 0.25 |

It will be noted that the growth rate of the silicon is much smaller than in the case of the preceding examples. The yield is also less; not more than about 30%.

While the principles of the invention have been described above in connection with specific embodiments, and particular modifications thereof, it is to be clearly understood that this description is made only by way of example and not as a limitation on the scope of the invention.

What is claimed is:

1. A process for manufacture of a coherent body of substantially pure silicon which comprises continuously directing a stream of substantially pure silane at the rate of between fifteen and thirty litres per hour onto the surface of a seed of silicon heated to a temperature of between 1000° C. and 1200° C., and located in an enclosure, and maintaining the pressure within said enclosure substantially between ten and fifteen millimeters of mercury, whereby thermal decomposition of said silane to produce silicon occurs substantially wholly upon the surface of said seed.

2. A process of manufacture of substantially pure silicon which comprises positioning a crystal of silicon within a chamber, heating a surface of said crystal to a temperature of 800° C. or higher, continuously directing a stream containing substantially pure silane having a partial pressure between 0.25% and 2.0% of normal atmospheric pressure at said decomposition temperature onto said heated surface, whereby silicon and hydrogen result from the decomposition, drawing the silicon formed by the decomposition steadily away from said zone, and removing the resultant hydrogen from said chamber.

3. A process according to claim 2 wherein the temperature maintained is between 800° C. and 1200° C.

4. A process according to claim 3 wherein the rate of introduction of silane into said heat zone is between five tenths litres and thirty litres per hour.

References Cited in the file of this patent

UNITED STATES PATENTS

| | | |
|---|---|---|
| 1,601,931 | Van Arkel | Oct. 5, 1926 |
| 1,617,161 | Koref et al. | Feb. 8, 1927 |
| 1,728,814 | Van Liempt | Sept. 17, 1929 |
| 2,768,061 | Cook et al. | Oct. 23, 1956 |
| 2,768,074 | Stauffer | Oct. 23, 1956 |

OTHER REFERENCES

Hogness et al.: "American Chemical Society Journal," 1936, vol. 58, pages 108–112.

Fiat Final Report 789, "Experiments to Produce Ductile Silicon," April 1946, 5 pages.